United States Patent [19]

Röhser

[11] 4,443,226
[45] Apr. 17, 1984

[54] PROCESS FOR DYEING TEXTILE SHEET-LIKE STRUCTURES MADE OF POLYESTER FIBERS FOR USE AS WARNING PROTECTIVE CLOTHING

[75] Inventor: Helmut Röhser, Hofheim am Taunus, Fed. Rep. of Germany

[73] Assignee: Hoechst Aktiengesellschaft, Frankfurt am Main, Fed. Rep. of Germany

[21] Appl. No.: 464,527

[22] Filed: Feb. 7, 1983

Related U.S. Application Data

[63] Continuation of Ser. No. 337,963, Jan. 8, 1982, abandoned, which is a continuation of Ser. No. 192,308, Sep. 30, 1980, abandoned.

[30] Foreign Application Priority Data

Oct. 2, 1979 [DE] Fed. Rep. of Germany ....... 2939918

[51] Int. Cl.³ .......................... C09B 57/08; D06P 1/16
[52] U.S. Cl. ............................................ 8/532; 8/642; 8/648; 8/653; 8/688; 8/692; 8/922
[58] Field of Search .................... 8/532, 642, 653, 688, 8/692, 648

[56] References Cited

U.S. PATENT DOCUMENTS

| | | | |
|---|---|---|---|
| 2,539,737 | 1/1951 | Grieshaber | 8/642 |
| 3,721,524 | 3/1975 | von der Eltz et al. | 8/637 |
| 3,741,971 | 6/1973 | Fuchs et al. | 546/47 |
| 3,920,662 | 11/1975 | Troster | 546/66 |
| 3,960,479 | 6/1976 | Tsujimoto et al. | 8/653 |
| 3,963,429 | 6/1976 | Tsujimoto et al. | 8/653 |
| 4,032,539 | 6/1977 | Tsujimoto et al. | 8/653 |

OTHER PUBLICATIONS

Colour Index (Third Edition), vol. 4 (Society of Dyers and Colourists), p. 4603, C.I. 73,300.

*Primary Examiner*—A. Lionel Clingman
*Attorney, Agent, or Firm*—Curtis, Morris & Safford

[57] ABSTRACT

Work clothing, having an optical warning effect, which has been dyed in specific, prescribed color shades and is not coated with plastics is desired by the authorities. Thioindigo and/or derivatives of the red and pink series of thioindigo, as the base dyestuff, in combination with specific yellow disperse dyestuffs have proved usable, for dyeings on polyester fibers or polyester/cotton fiber mixtures, which are in the required shade of fluorescent orange-red and meet the requirements regarding color point, luminance and fastness to light. Both the exhaustion process and the thermosol process can be used to produce these dyeings.

10 Claims, 1 Drawing Figure

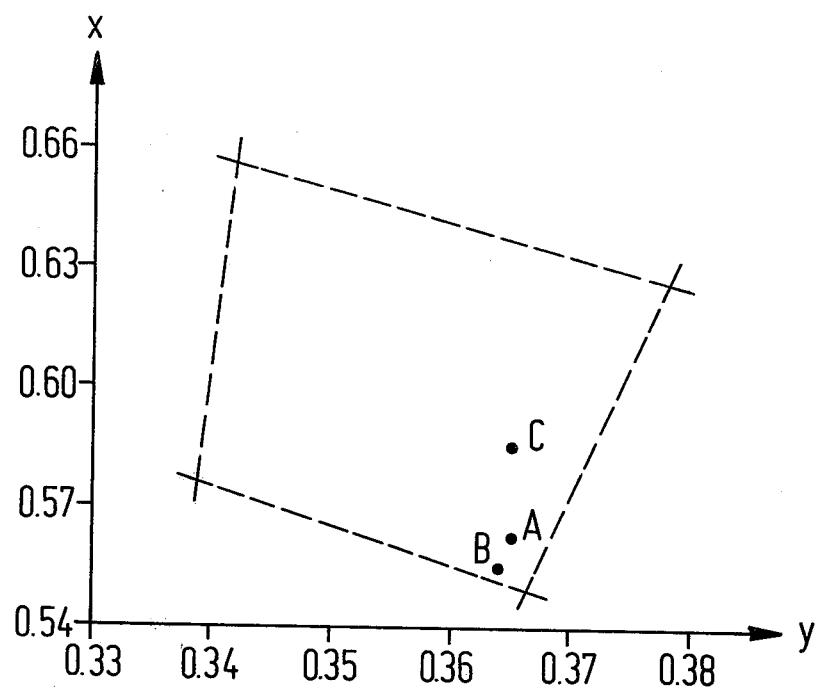

PROCESS FOR DYEING TEXTILE SHEET-LIKE STRUCTURES MADE OF POLYESTER FIBERS FOR USE AS WARNING PROTECTIVE CLOTHING

This is a continuation, of application Ser. No. 337,963 which is a continuation of Ser. No. 192,308 filed Jan. 8, 1982 and Sept. 30, 1980, respectively, both now abandoned.

The present invention relates to a process for dyeing, by an exhaustion process or thermosol process, textile sheet-like structures made of polyester fibers or of mixtures of polyester fibers and cotton, which are suitable for use as work clothing having an optical warning effect meeting the requirements of DIN No. 16,954, which, for all practical purposes, is the equivalent of British Standard 4610:1970 "Specification for Colours for High-Visibility Clothing" and similar standards promulgated in other countries.

Working clothing for the employees of the road construction departments and the railways, and other public service employees who are engaged in outdoor work have been manufactured from coated fabrics for a number of years. This coating contains, inter alia, fluorescent dyes, in order to make the clothing easy to see and to protect the wearer, distinguished in this way, from the danger of possible injury arising from traffic accidents. Such a type of clothing, which is conspicuous to the eye, is therefore known as warning protective clothing.

However, the fabrics according to DIN No. 16,954 which have been coated in this way and the warning clothing according to DIN No. 30,711 manufactured therefrom have many drawbacks, so that, in spite of the obligation to wear them, they are only used reluctantly and above all not regularly by the personnel involved.

One of the main drawbacks to which the reluctance or refusal previously mentioned can be ascribed is the complete impermeability to air of the garments, which is caused by the coating. This leads to reduced cutaneous respiration and thus to difficulties in the work to be performed, to the point that skin diseases (Intertrigo and the like) result therefrom.

A further disadvantage of the conventional finish for this special clothing is the unsatisfactory fastness to light of the warning color in the top layer. In spite of the use of light converters in the colored top layer, the fastness is only 4 on the rating according to DIN No. 54,004 which, for all practical purposes, is the equivalent of International Standard ISO 105/B-1978. In addition, even after a short time of exposure to light, the color shade changes from the prescribed red-orange towards the yellow side of the spectrum, so that it can no longer be described as a red or red-orange warning color. The garment thus becomes virtually unusable as warning clothing because of this color change, even before it is affected by mechanical wear and tear. For this reason the legal insurance requirements in respect of preventive protection against sources of danger in traffic are no longer fulfilled.

The Specialized Standards Committee for "Municipal Technology" and the Federal Office for Materials Testing nowadays advocate that, in the case of such warning protective clothing, the fastness to light of the coloration must be increased to at least rating 5, while retaining as far as possible the other factors determining the color properties, and that, above all, the considerable fading of the shade in the direction of the yellow side of the spectrum, on exposure to light, must be eliminated. In addition, the luminance factor $\beta$ should not be less than 0.35, even for an uncoated fabric. The concession just mentioned is necessary because, by virtue of its smoother surface, a coated fabric already has a higher luminance factor than an uncoated fabric in any case, regardless of its coloration.

The drawback, mentioned initially, of the special protective clothing under discussion, of the conventional type, can be eliminated, without incurring further disadvantages, by using uncoated fabrics made from natural or synthetic fibers. However, it has not hitherto been possible in this connection to achieve the required standard color values and, at the same time, the necessary luminance value, on textile material of this nature, that is to say by a simple dyeing operation. Hitherto it has only been possible to achieve such a result by coloring by means of a coating.

Because of the good technological properties of polyester fibers, fabrics made therefrom are of particular importance as fabrics for use in warning work-clothing.

It is the purpose and the object of the present invention, to produce, on breathing fabrics made of polyester fibers, without applying a coating or a colored top layer, dyeings which satisfy the requirements of the authorities concerned therewith, and, in particular, satisfy the personnel involved.

This object is achieved in accordance with the invention by employing thioindigo (2,2'-bis-thionaphtheneindigo) and/or derivatives in the red and pink series of 2,2'-bis-thionaphthene-indigo (thioindigo) as the base dyestuff for such dyeings in the required red-orange shades, in combination with the shading dyestuffs of the formula I

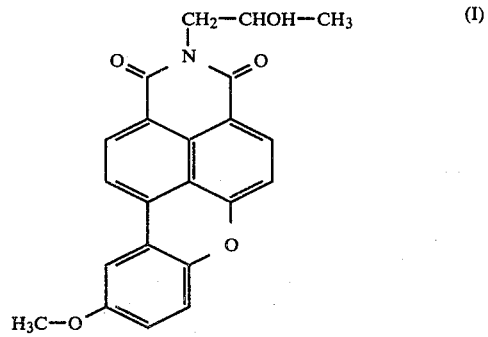

and/or of the formula II

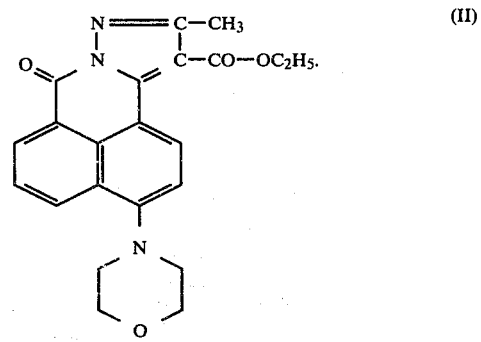

In this connection it is a particular advantage that these combinations of dyestuffs can be used in accordance with the invention to dye fabrics made of polyester fibers or corresponding mixed fabrics containing polyester fibers, in the customary manner by a continuous procedure or by an exhaustion process under HT conditions.

The FIGURE of drawing is an abstract from a CIE chromaticity diagram, and illustrates advantageous characteristics of the present invention.

The dyestuff thioindigo (Vat Red 41, C.I. No. 73,300) is particularly important as a base for the dyeing according to the present invention, because, on the one hand, it produces good fastness to light and good color retention, but, on the other hand, as a single dyestuff it reduces the luminance value $\beta$ of the combination dyeing less than any other red dyestuffs which are otherwise recommended for polyester fibers.

Thioindigo has hitherto only been employed in industry as a vat dyestuff for dyeing cellulose fibers. It has only been used occasionally as a dyestuff for dyeing polyester fibers because there are at present red dyestuffs belonging to the series of disperse dyestuff ranges which are more attractively priced for this purpose and have more suitable tinctorial properties.

It was therefore surprising and in no way foreseeable that thioindigo, of all dyestuffs in combination with a dyestuff of formula I and/or a dyestuff of formula II, would fulfil the necessary requirements for the quality of dyeings for protective clothing used for warning, as specified in DIN 16,954 in respect of color point, luminance and fastness to light.

As shown in the examples which follow, the dyestuff thioindigo, in combination with a dyestuff of formula I and/or a dyestuff of formula II can be used for dyeing, for the purposes of warning clothing, discontinuously both by the HT process at 120°–140° C. on jet dyeing machines and on HT winch vats, or continuously by the thermosol process

EXAMPLE 1

A fabric manufactured using warp yarn made of 100% polyester fibers and weft yarn made of polyester/cotton in a ratio of 70:30, the right hand side being formed by the warp yarn by virtue of the fabric construction (and thus consisting of polyester fibers), is dyed in a jet dyeing machine at a liquor ratio of 1:30 with an aqueous liquor containing 0.44% of the dyestuff of the formula II, 0.266% of thioindigo, C.I. No. 73,300 (not vatted) and 0.15 cm$^3$/l of 60% strength acetic acid (pH 6). The goods are dyed with this liquor for one hour at 130° C. and the dyeing thus produced is subsequently cleaned by rinsing with hot water and by treatment for 20 minutes at 80° C. with an aqueous liquor containing 2 cm$^3$/l of 32.5% strength sodium hydroxide solution, 2 g/l of sodium dithionite and 0.5 g/l of a nonionic detergent. When the textile material thus treated has been rinsed and dried, a red-orange, brilliant dyeing having the color point A in the above-mentioned FIGURE as further discussed later in the text, is obtained.

EXAMPLE 2

The same fabric as in Example 1 is dyed by the thermosol process with an aqueous liquor containing 20 g/l of the dyestuff of the formula II, 3.6 g/l of thioindigo, C.I. No. 73,300, 1 g/l of a wetting agent based on aliphatic sulfonic acids and 20 g/l of a thickener based on acrylamide. The textile material is padded at 40° C. at a liquor pick-up of 50% (of the weight of the goods), is dried at 125° C. and is subjected to thermosol treatment for 45 seconds at 210° C. The dyeing thus produced is then rinsed with warm water and after-treated as in Example 1.

The color point of this dyeing corresponds to point B in the above-mentioned FIGURE.

EXAMPLE 3

A fabric made of 100% polyester fibers is dyed in an HT winch vat at a liquor ratio of 1:30 with an aqueous liquor containing 0.45% of the dyestuff of the formula I, 0.3% of thioindigo, C.I. No. 73,300 and 0.15 cm$^3$/l of 60% strength acetic acid (pH 6).

The goods are dyed for 45 minutes at 130° C. and the dyeing thus produced is after-treated as in Example 1.

The color point of this dyeing corresponds to the point C in the FIGURE discussed below.

The demarcated area which can be seen on the above-mentioned FIGURE shows the color point trapezium prescribed by the specification of DIN No. 16,954, within which the color points of dyeings permitted for warning clothing must lie. The parameters x and y denote the coordinates for the CIE chromaticity coordinates in the case of the desired color, fluorescent orange-red. The color is determined using D 65 standard light, with a geometry of measurement in which illumination is at 45° and observation is at 0°. Measuring instruments which can be used are integrating filter photometers and spectrophotometers fitted with suitable illumination devices.

The points A, B and C are the color points of the dyeings obtained by means of Examples 1–3.

The luminance values of these three dyeings are:

$\beta_A = 0.40$ $\beta_B = 0.37$ $\beta_C = 0.38$

The fastness to light of the dyeings as specified in DIN No. 54,004 corresponds to the rating 5–6. If fading occurs, this undesirable phenomenon takes place in a general manner within the color shade and not towards the yellow side of the spectrum.

I claim:

1. A process for dyeing, by an exhaustion or a thermosol method, a textile sheet-like structure made from polyester fibers or from a mixture of polyester fibers and cotton, to produce a dyed structure suitable for use as protective clothing exhibiting an optical warning effect, without applying a coating or colored top layer, said dyed structure otherwise satisfying the requirements of DIN No. 16,954 as to
   (a) color point, in that the shade of the dyeing yields a fluorescent orange-red;
   (b) reflecting power, in that the luminance factor beta of the dyeing is not less than 0.35;
   (c) color retention, in that no substantial fading of the orange-red shade to the yellow side of the spectrum, on exposure to daylight, occurs; and
   (d) fastness properties, in that the fastness to light of the coloration is rated at least 5 according to DIN No. 54,004 when exposed to xenon light, while retaining the color properties set forth in (a), (b) and (c),
   which comprises dyeing said structure with a base dyestuff which is 2,2'-bis-thionaphthene-indigo or a derivative of the red and pink series of aforesaid thioindigo, in combination with the dyestuff of the formula

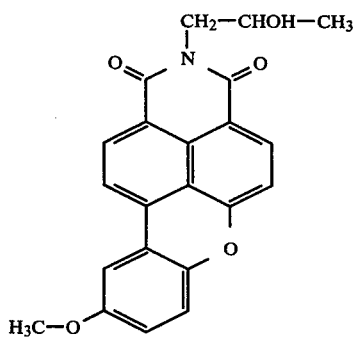

and/or the dyestuff of the formula

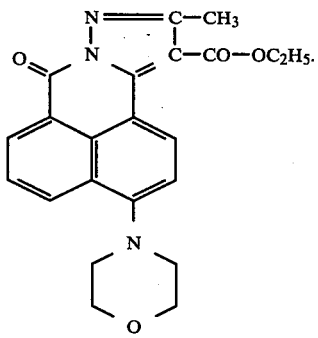

2. A dyed textile sheet-like structure produced by a process as defined in claim 1.

3. A process for dyeing, by an exhaustion or a thermosol method, a textile sheet-like structure made from polyester fibers or from a mixture of polyester fibers and cotton, to produce a dyed structure suitable for use as protective clothing exhibiting an optical warning effect, without applying a coating or colored top layer, said dyed structure otherwise satisfying the requirements of DIN No. 16,954 as to (a) color point, in that the shade of the dyeing yields a fluorescent orange-red;
(b) reflecting power, in that the luminance factor beta of the dyeing is not less than 0.35;
(c) color retention, in that no substantial fading of the orange-red shade to the yellow side of the spectrum, on exposure to daylight, occurs; and
(d) fastness properties, in that the fastness to light of the coloration is rated at least 5 according to DIN No. 54,004 when exposed to xenon light, while retaining the color properties set forth in (a), (b) and (c), which comprises dyeing said structure with a base dyestuff which is the dyestuff C.I. Vat Red 41 or a derivative of the red and pink series of said vat dyestuff in combination with the dyestuff of the formula

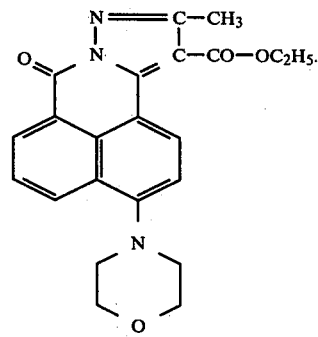

and/or the dyestuff of the formula $$\begin{array}{c}\text{N}=\!\!=\!\!\text{C}-\text{CH}_3\\ \text{O}=\!\!\!\!\!\!\!\!\!\!\!\!\!\!\!\!\!\!\!\!\!\!\!\!\!\!\!\!\!\!\!\!\!\!\text{N}\ \ \ \text{C}-\text{CO}-\text{OC}_2\text{H}_5.\end{array}$$

4. A dyed textile sheet-like structure produced by a process as defined in claim 3.

5. In a process for dyeing, by an exhaustion or a thermosol method, a textile sheet-like structure made from polyester fibers or from a mixture of polyester fibers and cotton to produce a dyed structure intended for use as protective clothing exhibiting an optical warning effect, without applying a coating or colored top layer, said dyed structure otherwise being intended to satisfy as many as achievable of the requirements of DIN No. 16,954 as to (a) color point, in that the shade of the dyeing should yield a fluorescent orange-red;
(b) reflecting power, in that the luminance factor beta of the dyeing should not be less than 0.35;
(c) color retention, in that no substantial fading of the orange-red shade to the yellow side of the spectrum, on exposure to daylight, should occur; and
(d) fastness properties, in that the fastness to light of the coloration should be rated at least 5 according to DIN No. 54,004 when exposed to xenon light, while retaining the color properties set forth in (a), (b) and (c), the improvement which comprises dyeing said structure with a base dyestuff which is 2,2'-bis-thionaphthene-indigo or a derivative of the red and pink series of aforesaid thioindigo, in combination with the dyestuff of the formula

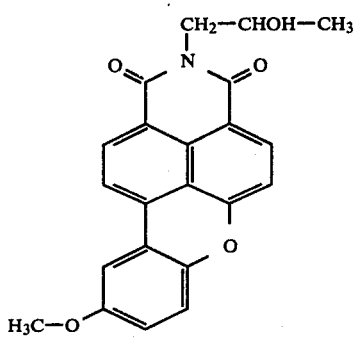

and/or the dyestuff of the formula

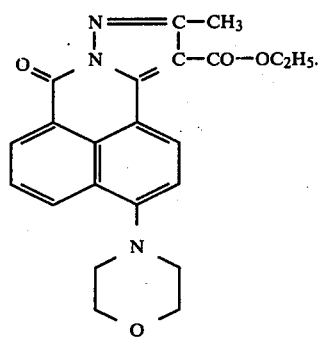

6. A dyed textile sheet-like structure produced by a process as defined in claim 5.

7. In a process for dyeing, by an exhaustion or a thermosol method, a textile sheet-like structure made from polyester fibers or from a mixture of polyester fibers and cotton to produce a dyed structure intended for use as protective clothing exhibiting an optical warning effect, without applying a coating or colored top layer, said dyed structure otherwise being intended to satisfy as many as achievable of the requirements of DIN No. 16,954 as to (a) color point, in that the shade of the dyeing should yield a fluorescent orange-red;

(b) reflecting power, in that the luminance factor beta of the dyeing should not be less than 0.35;

(c) color retention, in that no substantial fading of the orange-red shade to the yellow side of the spectrum, on exposure to daylight, should occur; and (d) fastness properties, in that the fastness to light of the coloration should be rated at least 5 according to DIN No. 54,004 when exposed to xenon light, while retaining the color properties set forth in (a), (b) and (c), the improvement which comprises dyeing said structure with a base dyestuff which is the dyestuff C.I. Vat Red 41 or a derivative of the red and pink series of said vat dyestuff, in combination with the dyestuff of the formula

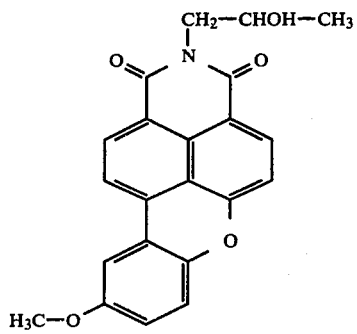

and/or the dyestuff of the formula

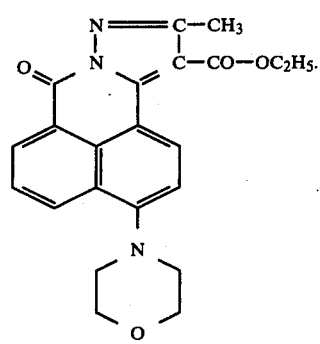

8. A dyed textile sheet-like structure produced by a process as defined in claim 7.

9. A process for dyeing, by an exhaustion or a thermosol method, a textile sheet-like structure made from polyester fibers or from a mixture of polyester fibers and cotton, to produce a dyed structure suitable for use as protective clothing exhibiting an optical warning effect, without applying a coating or colored top layer, said dyed structure exhibiting:

(a) a fluorescent orange-red shade having a color point with chromaticity coordinates, determined by photometric measurement using an integrating filter photometer or spectrophotometer fitted with illumination devices applying D65 standard light, and with a geometry of measurement in which illumination is at 45° and observation is at 0°, falling within a color point trapezium defined by four corners with the following coordinates:

| | |
|---|---|
| $X=0.622$, $Y=0.378$; | (1) |
| $X=0.549$, $Y=0.366$; | (2) |
| $X=0.576$, $Y=0.339$; | (3) |
| $X=0.658$, $Y=0.342$; | (4) |

(b) reflecting power defined by luminance factor beta, derived from the coordinates in subparagraph (a), not less than 0.35;

(c) on exposure to daylight, no significant fading of the orange-red shade toward the yellow end of the spectrum; and (d) fastness to light of at least 5 in accordance with ISO/R 105/V-1969 Part 2, International Standard ISO 105/B-1978;

which comprises dyeing said structure with a base dyestuff which is 2,2'-bis-thionaphthene-indigo or a derivative of the red and pink series of aforesaid thioindigo, in combination with the dyestuff of the formula

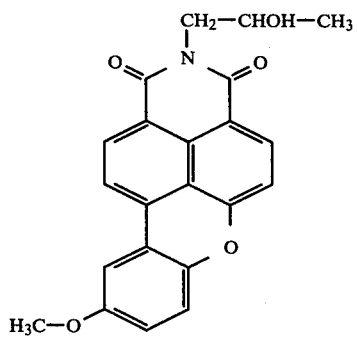

and/or the dyestuff of the formula

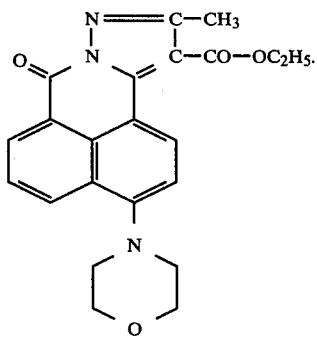

10. A process for dyeing, by an exhaustion or a thermosol method, a textile sheet-like structure made from polyester fibers or from a mixture of polyester fibers and cotton, to produce a dyed structure suitable for use as protective clothing exhibiting an optical warning effect, without applying a coating or colored top layer, said dyed structure exhibiting:

(a) a fluorescent orange-red shade having a color point with chromaticity coordinates, determined by photometric measurement using an integrating filter photometer or spectrophotometer fitted with illumination devices applying D65 standard light, and with a geometry of measurement in which illumination is at 45° and observation is at 0°, falling within a color point trapezium defined by four corners with coordinates:

| | |
|---|---|
| X=0.622, Y=0.378; | (1) |
| X=0.549, Y=0.366; | (2) |
| X=0.576, Y=0.339; | (3) |
| X=0.658, Y=0.342. | (4) |

(b) reflecting power defined by luminance factor beta, derived from the coordinates in subparagraph (a), not less than 0.35;

(c) on exposure to daylight, no significant fading of the orange-red shade toward the yellow end of the spectrum; and (d) fastness to light of at least 5 in accordance with ISO/R 105/V-1969 Part 2, International Standard ISO 105/B-1978;

which comprises dyeing said structure with a base dyestuff which is the dyestuff C.I. Vat Red 41 or a derivative of the red and pink series of said vat dyestuff, in combination with the dyestuff of the formula

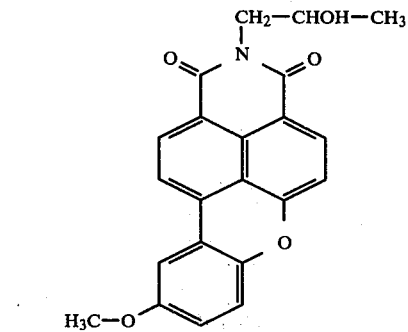

and/or the dyestuff of the formula

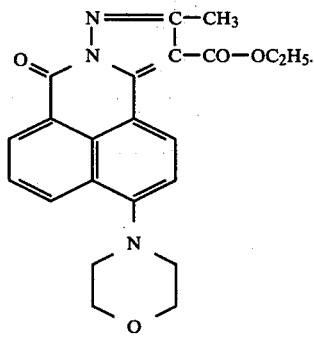

* * * * *